C. R. RAGSDALE.
DEMOUNTABLE RIM.
APPLICATION FILED FEB. 17, 1916.
1,224,666. Patented May 1, 1917.
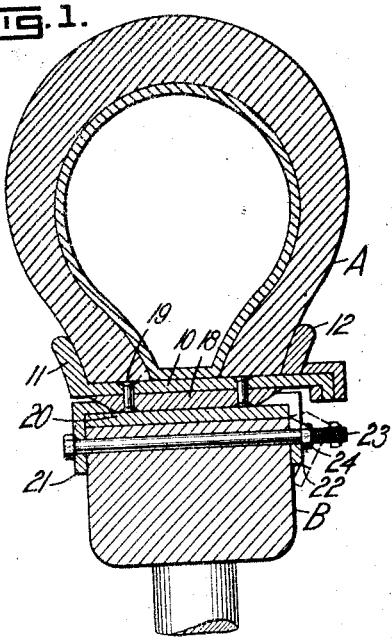
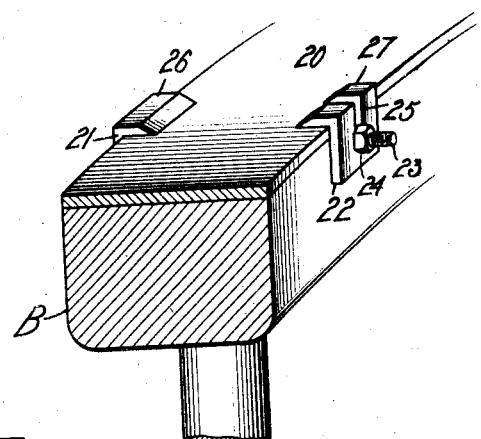
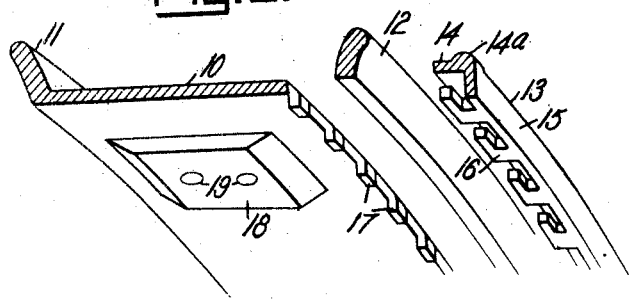
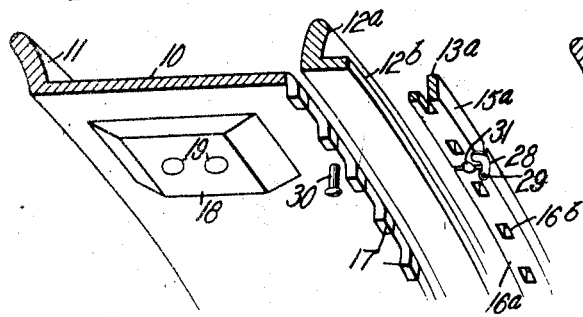
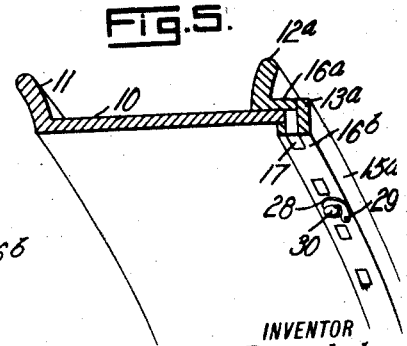
WITNESSES
INVENTOR
Charles R. Ragsdale
BY
ATTORNEYS

UNITED STATES PATENT OFFICE.

CHARLES REED RAGSDALE, OF ST. LOUIS, MISSOURI.

DEMOUNTABLE RIM.

1,224,666.   Specification of Letters Patent.   Patented May 1, 1917.

Application filed February 17, 1916. Serial No. 78,858.

*To all whom it may concern:*

Be it known that I, CHARLES REED RAGSDALE, a citizen of the United States, and a resident of the city of St. Louis and State of Missouri, have invented a new and Improved Demountable Rim, of which the following is a full, clear, and exact description.

My invention relates to demountable rims for the wheels of automobiles and other vehicles, and more particularly to that type of demountable rim having means whereby to detach the tire from the demountable rim without removing the rim from the wheel.

My present invention has various objects in view, which will more fully appear as the description proceeds.

The demountable rims generally employed, require a felly band having a bead at one edge and with this type, when the wheel is run directly on the felly band as is often necessary, the bead is usually damaged.

My invention provides a demountable rim and securing means constructed and arranged to coöperate with an unbeaded felly band, that is to say, a band presenting a flat outer surface extending to the extreme side edges.

The present invention includes also, a novel means to detachably secure the tire on the demountable rim.

Reference is to be had to the accompanying drawings forming a part of this specification in which similar reference characters indicate corresponding parts in all the views.

Figure 1 is a transverse section of a demountable rim and its appurtenances embodying my invention, the same being shown with a portion of a wheel and a tire;

Fig. 2 is a fragmentary perspective view of a portion of the wheel, and showing felly attachments for securing the demountable rim;

Fig. 3 is a fragmentary perspective view showing separated elements of the demountable rim;

Fig. 4 is a view similar to Fig. 3 but illustrating a slightly different form of the demountable rim;

Fig. 5 is a view similar to Fig. 4, showing the elements of the latter figure assembled.

In carrying out my invention in the form shown in Figs. 1 to 3, the demountable rim 10 has an integral annular bead 11 of any approved shape at one side of the wheel, preferably the inner side or side toward the vehicle body. At the opposite side, the rim 10 receives a removable annular bead 12 to coact with the bead 11 in retaining the tire A.

I provide a retaining ring 13, of novel form, which coacts with members on the adjacent edge of the rim 10 to retain the removable bead 12 in position. The said ring 13 is in general, angular in cross section presenting a lateral flange 14 and a radial flange 15. At the inner edge of the radial flange 15, at the inside of said flange, I form hooks 16 on said rim, the hooks being of L-shape and integral at their bases with the flange 15. The hooks are disposed in succession about the ring 13, and are approximately parallel with the lateral flange 14 and disposed radially inward from the latter. The formation results, as clearly seen in Fig. 3, is an L-shaped slot at each hook, said slots being complementary to the space between the lateral flange 14 and said hooks, that is, the L-shaped slots communicate radially with the annular space within the lateral flange 14.

To co-act with the hooks 16, I provide on the adjacent edge of the rim 10, an annular series of lugs 17, extending radially inward beyond the inner surface of the said rim 10. The number and the spacing of the lugs 17 conform to the positions of the hooks 16 so that when the removable bead 12 is placed on the rim 10, outside of the tire A, the ring 13 may be placed on the adjacent edge of the rim 10 outside of said bead 12. In fitting the ring 13 on the rim 10, the edge of the latter is received in the annular space within the lateral flange 14, between the said flange and the hooks 16, and in such manner that the lugs 17 will be disposed in staggered relation to the said hooks and enter laterally the L-shaped slots between the hooks. The ring 13 is now given a slight turning movement on its axis, relatively to the rim 10, whereby the hooks 16 will engage at the inner side of the respective lugs 17 and prevent retrograde lateral movement of the ring 13. Upon the tire being inflated, the removable bead 12 will be pressed firmly against the adjacent edge of the lateral flange 14 and prevent creeping movement of the ring 13.

It will be apparent that the ring 13 may be attached and detached with facility and despatch in applying or removing the tire A from the demountable rim.

To receive a blow of a hammer or the like, for shifting the ring, 13, circumferentially, there is formed a projection 14ª on said ring at the angle thereof.

My improved means for demountably securing the rim 10 on a wheel, while avoiding the use of a beaded felly band, will now be described. At the under side of the rim 10, I produce beveled surfaces at each side of the rim and within the side edges of the said rim. For the purpose, I apply to the rim, at the inner side, at intervals, plates 18, securing the same by rivets 19 or other means, said plates having beveled side edges. The plates 18 are received on the outer surface of a felly band 20, secured in any suitable manner to the felly B of any approved form. It is to be observed that the felly band 20 is cylindrical and presents a flat outer surface extending to the extreme side edges, there being no beads on said band at either side.

To coact with the beveled elements 18, I employ plates 21 on the felly at one side of the wheel and plates 22 at the opposite side, the latter plates preferably being at the front or outside of the wheel. The respective plates 21, 22, are secured in opposite relation by transverse bolts 23, and nuts 24, said bolts passing through the felly, through bolt holes in the plates 21, and through slots 25 in the plates 22. The pairs of plates correspond in number and in their locations about the wheel with the number and spacing of the plates 18 on the rim 10 so that a pair of opposite plates, 21, 22, will receive between them a plate 18.

The plates, 21, 22, are disposed radially on the felly B; at the outer end of each plate 21, the same presents a flange 26 disposed laterally inward, that is to say, toward the opposite side of the wheel. Said flange 26 has a beveled inner edge corresponding with the bevel on the adjacent side of a plate 18. Similarly the outer end of each plate 22 is inturned laterally and by reason of the slot 25, presents separate flanges 27, having inner beveled edges corresponding with the adjacent bevel of a plate 18.

The flanges, 26, 27, of the respective plates, 21, 22, thus extend between the flat unbeaded felly band 20 and the inner surface of the demountable rim 10 and extend inwardly a sufficient distance to contact with the beveled sides of the plates 18.

An important purpose is served by forming the slots in the plates 22 as the slots permit said plates to be entirely removed from the wheel without removing the bolts 23. If it becomes necessary to run the car on the felly band, the plates 22 are quickly removed without having to remove the nuts 24 as the nuts are simply moved outward toward the end of the bolts and the bolts then pushed inward toward the car so that the bolt heads are released from contact with the inner plates 21 permitting these plates to be turned on the bolts 23 until the flanges 26, which ordinarily rest on the felly band are turned toward the wheel hub; the bolts are now tightened which hold the plates 21 in the new position, and as the front or slotted plates 22 have been entirely removed the flat beadless felly band now will run on the ground and with all of the inner plates 22 out of the way and not in contact with the road.

When it is desired to demount the rim 10, it is necessary only to loosen the nuts 24, without entirely removing the latter from the bolts 23. The loosening of the nuts permits the lateral movement of the plates 22 on the bolts 23 after which said plates may be moved radially inward to the dotted line position indicated in Fig. 1, thereby permitting the demountable rim to clear the flanges 27 and be slipped from the felly band 20. The plates 22 may be secured in the inner dotted line position by tightening up the nuts 24 to press the said plates against the side of the felly. It will thus be seen that it is not necessary to wholly remove the plates 22 from the felly and bolts in demounting the rim 10, as the plates may be held on the felly in convenient position for again securing the demountable rim in place on the wheel. The described construction serves to center the demountable rim and the tire on the wheel by reason of the wedging action of the plates 21, 22, whereas a felly band with a front beaded edge, does not permit of the accurate fitting of the demountable rim to the wheel because the said rim can easily be forced out of proper alinement by reason of the said rim being forced farther onto the said bead at one portion of the rim than at another.

The strength and simplicity of the detaching means, consisting of the plates, 21, 22, and the coacting beveled surfaces on the demountable rim, will be apparent. Also, it will be clear that the described ring 13, with the hooks 16, and the members 17 on the rim 10, result in a strong construction that may be cheaply produced in addition to the result of promoting simplicity in attaching and detaching the tire and insuring accuracy of adjustment without tedious manipulation.

In Figs. 4 and 5, a modified means for retaining the removable bead in position is illustrated. In the modified construction, however, the elements, 10, 11, 17, 18 and 19 are the same as previously described and hence are identified by the same characters. The removable bead 12ª, is formed with a base flange 12ᵇ extending laterally outward. The retaining ring 13ª in the modified construction, is a split ring, whereas the ring 13 may be either split or of unbroken continuity. The ring 13ª is substantially angular in cross section and comprises a radially disposed flange 15ª and an inwardly extending lateral flange 16ª, having means whereby the flange serves the purpose of the hooks 16. Said flange 16ª is at the inner periphery of the radial flange 15ª and is adapted to overlap the adjacent edge of the demountable rim 10 at the inner surface of the latter instead of overlapping at the outer surface as is done by the flange 14. A series of radial openings 16ᵇ is formed in the lateral flange 16ª. Said openings correspond in number, in position, and essentially in form, with the lugs 17 on the rim 10 to receive the latter. The split ring 13ª is contracted by overlapping the same at the ends and is then permitted to spring outwardly to engage the lugs 17 in the openings 16ᵇ, while the edge of the rim 10 is accommodated in the space radially outward from the flange 16ª. The said space accommodates also, the lateral flange 12ᵇ on the bead 12ª. To positively lock the split ring 13ª in engagement with the lugs 17, a latch 28 is pivoted as at 29, at one end of the said ring and is adapted to engage beneath the head of a pin 30 on the rim 10 at the inner side thereof, said pin being accommodated in a pin-hole formed by opposed depressions 31 in the respective ends of the ring 13ª.

In both forms of the retaining ring 13, 13ª, the same coöperates with the lugs 17 integral with the rim 10 and disposed radially inward on the latter. The L-shaped slots, defined by the hooks 16, it will be seen, constitute openings extending radially as do the openings 16ᵇ to accommodate the radially disposed lugs 17.

The construction of the rim leaves the latter perfectly plain at the surface and free of all members or formations at that edge on which the removable bead is secured, the arrangement resulting in simplifying the form of the retaining means and facilitating the placing and removing of the tire, and in addition promotes durability and economy of manufacture.

Having thus described my invention I claim as new and desire to secure by Letters Patent:

1. A wheel rim having a tire retaining bead at one edge and a plurality of inwardly directed radial lugs at its other edge, a tire retaining bead member removably held on said rim at said last named edge, and means for holding said bead member in place consisting of a ring bearing on the outer side of said bead member and provided with a plurality of bayonet slots for the reception of the respective radial lugs, a dependent headed pin on said rim, and a hook shaped latch pivoted to said removable bead member and adapted to engage said pin to hold said bead member in place.

2. A wheel rim having a tire retaining bead at one edge and a plurality of inwardly directed radial lugs at its other edge, a tire retaining member removably held on said rim at said last named edge, and a ring bearing on the outer side of said tire retaining member having a member arranged parallel with said rim provided with a plurality of spaced bayonet slots for the reception of the respective radial lugs, said tire retaining member and said ring jointly forming a recess for the last named edge of said rim, a dependent headed pin on said rim, and a hook shaped latch pivoted to said removable bead member and adapted to engage said pin to hold said bead member in place.

In testimony whereof I have signed my name to this specification in the presence of two subscribing witnesses.

CHARLES REED RAGSDALE.

Witnesses:
  WILLIAM B. HOWSE,
  L. G. ALLEN.